(12) United States Patent
Ma

(10) Patent No.: US 10,039,270 B2
(45) Date of Patent: Aug. 7, 2018

(54) ASIAN CARP FISHING DEVICE

(71) Applicant: Haibin Ma, Harbin (CN)

(72) Inventor: Haibin Ma, Harbin (CN)

( * ) Notice: Subject to any disclaimer, the term of this patent is extended or adjusted under 35 U.S.C. 154(b) by 282 days.

(21) Appl. No.: 15/212,255

(22) Filed: Jul. 17, 2016

(65) Prior Publication Data

US 2017/0013813 A1   Jan. 19, 2017

(30) Foreign Application Priority Data

Jul. 17, 2015   (CN) .......................... 2015 1 0423777

(51) Int. Cl.
| | | |
|---|---|---|
| *A01K 73/06* | (2006.01) | |
| *A01K 73/02* | (2006.01) | |
| *A01K 73/04* | (2006.01) | |
| *A01K 73/053* | (2006.01) | |
| *B63B 35/16* | (2006.01) | |

(52) U.S. Cl.
CPC .............. *A01K 73/06* (2013.01); *A01K 73/02* (2013.01); *A01K 73/04* (2013.01); *A01K 73/053* (2013.01); *B63B 35/16* (2013.01)

(58) Field of Classification Search
None
See application file for complete search history.

(56) References Cited

U.S. PATENT DOCUMENTS

| | | | | | |
|---|---|---|---|---|---|
| 2,203,565 | A | * | 6/1940 | Field .................... | B63B 35/26 114/343 |
| 2,551,431 | A | * | 5/1951 | Field .................... | B63B 35/26 114/343 |
| 3,091,880 | A | * | 6/1963 | Puretic ................. | A01K 73/06 414/137.7 |
| 3,261,122 | A | * | 7/1966 | Guicheney ........... | A01K 73/02 43/14 |
| 3,494,064 | A | * | 2/1970 | Stein .................... | A01K 69/00 43/102 |
| 3,662,484 | A | * | 5/1972 | Dres .................... | A01K 73/02 43/4.5 |
| 3,793,760 | A | * | 2/1974 | Puretic ................. | A01K 73/06 43/4.5 |
| 3,938,274 | A | * | 2/1976 | Seymour .............. | A01K 73/12 114/125 |
| 4,449,315 | A | * | 5/1984 | Puretic ................. | A01K 73/12 43/8 |

(Continued)

*Primary Examiner* — Michael H Wang
(74) *Attorney, Agent, or Firm* — Novoclaims Patent Services LLC; Mei Lin Wong

(57) ABSTRACT

A fishing device particularly designed for Asian carp fishing, which includes two fishing boats, a collection frame, a fishing net, a display mechanism with a plurality of optical sensors and optical receivers, one support mechanism for one fishing boat and one lifting mechanism for one fishing boat. The lifting mechanism includes a motor, a rotary shaft, a bait holding basket, a plurality of shaft supports and a plurality of rope units. Thus, a selected bait can be used for classification fishing. The quantity of fish catch can be determined timely through the display mechanism. The lifting mechanism allows steading lifting of the fish catch out of the water without introducing any harm to the fish catch. The number and survival rate of the fish catch can be ensured while an effective fishing can be achieved. This fishing device is particularly designed for catching Asian carp fishes.

17 Claims, 2 Drawing Sheets

(56) References Cited

U.S. PATENT DOCUMENTS

| | | | | |
|---|---|---|---|---|
| 4,930,444 A | * | 6/1990 | Vasile | A01K 61/60 |
| | | | | 119/223 |
| 6,343,433 B1 | * | 2/2002 | Granberg | A01K 75/00 |
| | | | | 114/255 |
| 2006/0144773 A1 | * | 7/2006 | Thomazeau | E02B 15/045 |
| | | | | 210/241 |
| 2012/0117850 A1 | * | 5/2012 | Panovic | A01K 74/00 |
| | | | | 43/4.5 |

* cited by examiner

ASIAN CARP FISHING DEVICE

CROSS REFERENCE OF RELATED APPLICATION

This is a non-provisional application which claimed priority of Chinese application number 201510423777.3, filing date Jul. 17, 2015. The contents of this specification, is incorporated herein by reference.

BACKGROUND OF THE PRESENT INVENTION

Field of Invention

The present invention relates a fishing device, and more particularly to a fishing device for Asian carp.

Description of Related Arts

Conventional fishing methods which are commonly used includes fishhooks fishing, fishing by small fishing nets, seine fishing using a seine or dragnet and electrofishing. However, the use of fishhooks and small fishing nets for fishing has the drawbacks of low fish catch and large manpower requirement, which is not suitable for large scale fishing. When seine fishing is used, the fish being caught may escape into the water easily and hence the fishing efficiency is affected. When electrofishing is used, the ultrasonic wave may lead to hypoxia of the head and heart of the fish such that the fish is floated to the water surface. The survival rate of the fish catch from this fishing method is low, the fish catch cannot be effectively used and resources are wasted. Also, this method does not allow classification fishing for catching a specific species of fishes.

SUMMARY OF THE PRESENT INVENTION

In order to solve the problems of existing arts, that is: low fish catch and large manpower requirement which is not suitable for large scale fishing in fishing with fishhooks and small fishing nets, low fishing efficiency in seine fishing, low survival rate, ineffective and waste of resources in electrofishing, and failure to provide classification fishing, an object of the present invention is to provide a fishing device which can resolve the above problems.

Additional advantages and features of the invention will become apparent from the description which follows, and may be realized by means of the instrumentalities and combinations particular point out in the appended claims.

According to the present invention, the foregoing and other objects and advantages are attained by the followings:

A fishing device, comprising: a collection mechanism, a display mechanism, two fishing boats, two support mechanisms and two lifting mechanism; wherein the collection mechanism comprises a collection frame and a fishing net, wherein the lifting mechanism comprises a motor, a rotary shaft, a bait holding basket, a plurality of shaft supports and a plurality of rope units, wherein the collection frame has a main frame body defining an opening at a top end, wherein the two fishing boats are aligned side by side and are in parallel with each other, wherein the collection frame is positioned between the two fishing boats, wherein the fishing net is laid on an inner surface of the collection frame, wherein the bait holding basket is mounted to position inside the collection frame through a connecting rod, wherein each the fishing boat comprises one the support mechanism and one the motor, wherein each the motor is positioned proximal to the collection frame 6 and is fixed mounted on the fishing boat, wherein the rotary shaft is fixedly mounted on an output terminal of a motor shaft of the motor, wherein the rotary shaft is connected to the plurality of shaft supports and a bearing is provided between the rotary shaft and the shaft supports, wherein each the shaft supports is mounted on the fishing boat, wherein the support mechanism is mounted on the fishing boat at a position between the collection frame and the motor, wherein each the rope unit has one end connecting to a top end of the collection frame and an opposing end bypassing an adjacent support mechanism to connect to fix and wind on the rotary shaft, wherein the display mechanism is fixedly mounted on the main frame body of the collection frame.

The advantageous effects according to the present invention are:

(a) the present invention can based on the differences of bait preference and habit between different species of fishes to use different type of bait for classification fishing such that classification fishing based on the fish type can be achieved.

(b) the display mechanism is employed to detect the number of fish catch in the collection frame 6. Through each of the optical receivers 17, determine whether the optical source from each of the optical sensors 16 is received. Through the optical source being blocked by the fish catch inside the collection frame 6 and through the receiving screen 18 to display the number of optical sensors 16 emitting to the optical receivers 17, determine the number of fish catch in the collection frame 6. If all the optical receivers 17 cannot receive the optical source from the optical sensors 16, which is displayed through the receiving screen 18, it is determined that the number of fish catch in the collection frame 6 reached a preset number. Then, through activating the motor 9 to drive the rotary shaft 10 and then driving the rope unit 12 to wind along the rotary shaft 10. Thus, the collection frame 6 is lifting upwardly slowly and move out of the water surface. Accordingly, batch fishing can be achieved.

(c) the present invention is simple in structure, easy to operate and highly efficient while damages to fishes being caught is prevented when the fishing device according to the present invention is used, thereby the survival rate of fish catch is ensured and the utilization rate of resources is increased.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Preferred Embodiment 1

Figure 1:
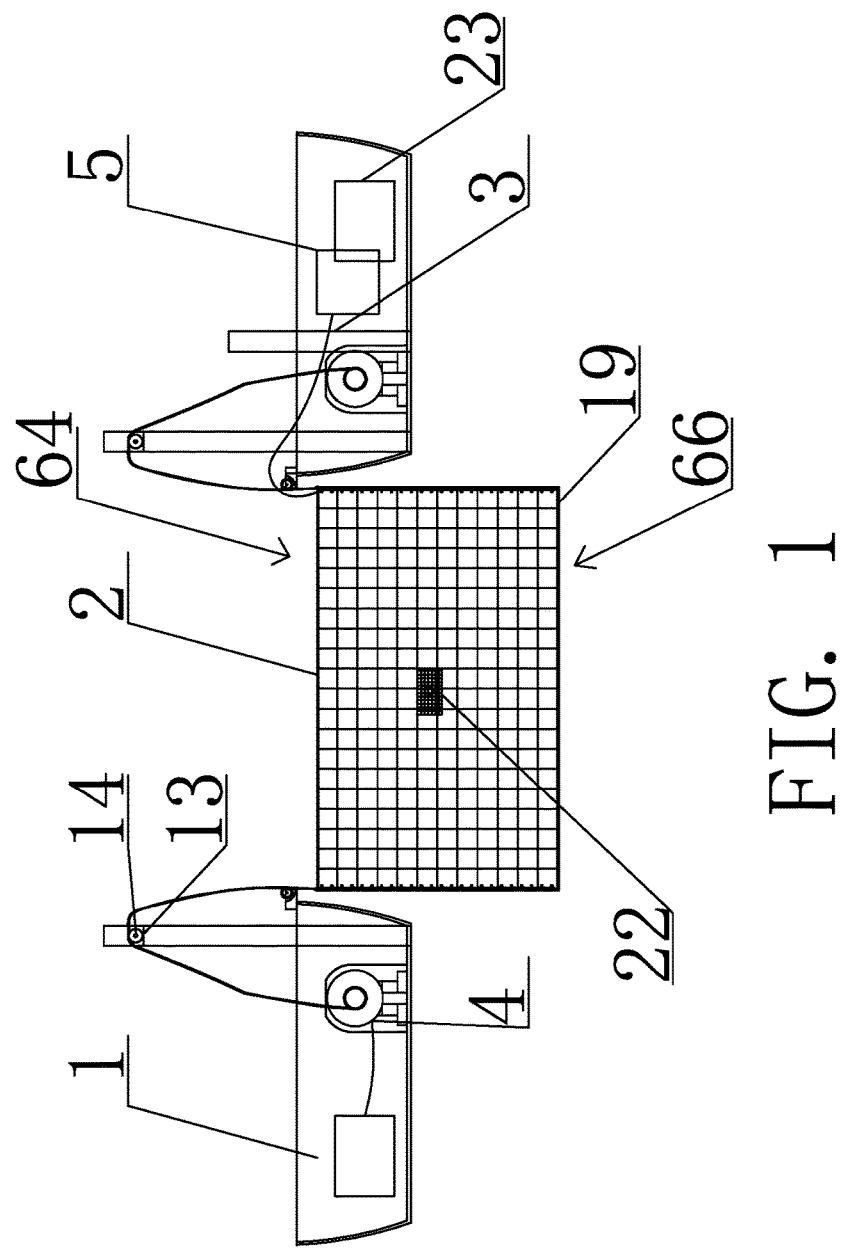
FIG. 1 is a front view illustration of the fishing device according to a preferred embodiment of the present invention.
Figure 2:
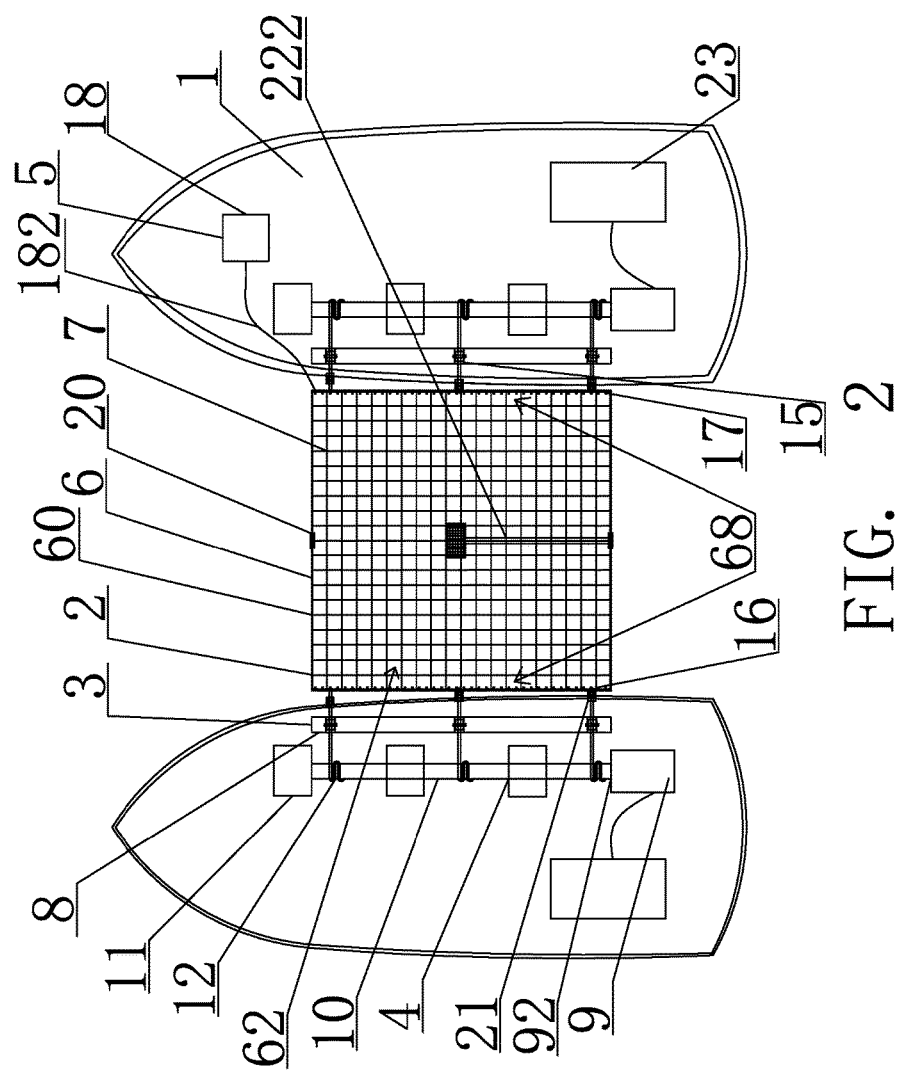
FIG. 2 is a top view illustration of the fishing device according to the above preferred embodiment of the present invention.

Referring to FIG. 1 and FIG. 2 of the drawings, the fishing device according to this preferred embodiment of the present invention is illustrated. The fishing device includes a collection mechanism 2, a display mechanism 5, two fishing boats 1, two support mechanisms 3 and two lifting mechanism 4. The collection mechanism 2 comprises a collection frame 6 and a fishing net 7. The lifting mechanism 4 comprises a motor 9, a rotary shaft 10, a bait holding basket 22, a plurality of shaft supports 11 and a plurality of rope units 12. The collection frame 6 has a main frame body 60 defining an opening 62 at a top end 64. The two fishing boats 1 are arranged side by side and are in parallel. The collection frame 6 is positioned between the two fishing boats 1. The fishing net 7 is laid on an inner surface of the collection frame 6. The bait holding basket 22 is mounted inside the collection frame 6 through a connecting rod 222. For each of the fishing boat 1, each of the fishing boat 1 comprises one support mechanism 3 and one motor 9. The motor 9 is positioned near the collection frame 6 and is mounted onto the fishing boat 1. The rotary shaft 10 is fixedly mounted onto an output terminal 92 of a motor shaft of the motor 9. The rotary shaft 10 is connected to the plurality of shaft supports 11 and a bearing is provided between the rotary shaft 10 and each shaft supports 11. Each of the shaft supports 11 is mounted onto the fishing boat 1. The support mechanism 3 is mounted onto the fishing boat 1 at a position between the collection frame 6 and the motor 9. Each of the rope unit 12 has one end connecting to the top end of the collection frame 6 and an opposing end bypassing the adjacent support mechanism 3 to connect to fix and wind on the rotary shaft 10. The display mechanism 5 is fixedly mounted on the main frame body 60 of the collection frame 6. Based on the bait being placed inside the bait holding basket 22, fishes are attracted towards the collection frame 6. Since different fish species has different bait preferences, classification fishing for different species of fishes can be achieved.

Preferred Embodiment 2

Referring to FIG. 1 and FIG. 2 of the drawings, the fishing device according to this preferred embodiment of the present invention is illustrated. According to this preferred embodiment, the support mechanism 3 comprises a support frame 8, a plurality of wheel units 13 and a plurality of roller shaft 14. The support frame 8 has a top end at which a plurality of indentations 15 are provided. Each wheel unit 13 is connected to one roller shaft 14. One roller shaft 14 is installed at one indentation 15. All other elements and connection relationships are the same as that of the preferred embodiment 1.

Preferred Embodiment 3

Referring to FIG. 1 and FIG. 2 of the drawings, the fishing device according to this preferred embodiment of the present invention is illustrated. According to this preferred embodiment, the display mechanism 5 comprises a receiving screen 18, a plurality of optical sensors 16 and a plurality of optical receivers 17. The plurality of optical sensors 16 and the plurality of receivers 17 are fixed mounted onto the collection frame 6 at two opposing inner sides 68 of the collection frame 6. Each one optical sensor 16 is communicating with one corresponding optical receiver 17. Each of the optical receiver 17 is electrically connected to the receiving screen 18 through connecting wire 182. The receiving screen 18 is arranged on the fishing boat 1. All other elements and connection relationships are the same as that of the preferred embodiment 1.

Preferred Embodiment 4

Referring to FIG. 1 and FIG. 2 of the drawings, the fishing device according to this preferred embodiment of the present invention is illustrated. According to this preferred embodiment, a bottom portion 66 of the collection frame 6 further comprises a rectangular outlet door 19. The fishing net 7 which is laid onto the bottom surface of the collection frame 6 further comprises a rectangular outlet net corresponding to the rectangular outlet door 19. The rectangular outlet net is laid on top of the rectangular outlet door 19. The rectangular outlet door 19 has one end connecting to the collection frame 6 through a hinged connection while another end mounting to the collection frame 6 through an axle pin. All other elements and connection relationships are the same as that of the preferred embodiment 1.

Preferred Embodiment 5

Referring to FIG. 1 and FIG. 2 of the drawings, the fishing device according to this preferred embodiment of the present invention is illustrated. According to this preferred embodiment, the fishing device further comprises two hooks 20 fixedly mounted to the collection frame 6 at an upper end of the collection frame. All other elements and connection relationships are the same as that of the preferred embodiment 4.

Preferred Embodiment 6

Referring to FIG. 1 and FIG. 2 of the drawings, the fishing device according to this preferred embodiment of the present invention is illustrated. According to this preferred embodiment, the mesh number of fishing net 7 is 1-3 mesh. All other elements and connection relationships are the same as that of the preferred embodiment 1.

Preferred Embodiment 7

Referring to FIG. 1 and FIG. 2 of the drawings, the fishing device according to this preferred embodiment of the present invention is illustrated. According to this preferred embodiment, the fishing device further comprises a plurality of guiding wheel assemblies 21. On each of the fishing boat 1, a plurality of guiding wheel assemblies 21 are installed. The moving direction of the rope units 12 are guided through the guiding wheel assemblies 21 so as to ensure that the collection framework 6 to having a steady lifting movement. All other elements and connection relationships are the same as that of the preferred embodiment 1.

Preferred Embodiment 8

Referring to FIG. 1 and FIG. 2 of the drawings, the fishing device according to this preferred embodiment of the present invention is illustrated. According to this preferred embodiment, the fishing device further comprises two solar power supply units 23. Preferably, the solar power supply unit 23 is a solar panel. One solar panel 23 is mounted on each of the fishing boats 1 and the solar panel 23 is connected to the motor 9. Through the solar panel 23, solar energy is collected to provide power to the motor 9 such that an energy saving effect is achieved. All other elements and connection relationships are the same as that of the preferred embodiment 1.

Work Principle

The operation of the fishing device according to the present invention is illustrated as follows: a selected bait is placed inside the bait holding basket 22 and the collection frame 6 is dropped into the fishing site area. The upper end of the collection frame 6 is fully immersed inside the water and below the water surface. The switch of each of the optical sensors 16 and the switch of the receiving screen 18 are turned on. Through observing the display of the receiving screen 18, determine whether the optical source emitted from each of the optical sensors 16 is received by each of the corresponding optical receivers 17 so as to determine the number of fish catch inside the collection frame 6. If the fish catch inside the collection frame 6 reaches a preset number, through the motor 9 to drive the rotary shaft 10 to rotate, then the rotary shaft 10 drives the movement of the rope unit 12 and the rope unit 12 to wind onto the rotary shaft 10. Thus, the collection frame 6 is lifted slowly and upwardly such that the collection frame 6 is out of the water surface. The connecting wire 182 between the optical receiver 17 and the receiving screen 18 is disconnected. The collection frame 6 is moved to the fish catch loading zone. Remove the axle pin at the rectangular outlet door 19 in the bottom of the collection frame and then the fish catch is loaded from the collection frame 6.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fishing device for Asian carp, comprising: a collection mechanism (2), a display mechanism (5), two fishing boats (1), two support mechanisms (3) and two lifting mechanism (4); wherein said collection mechanism (2) comprises a collection frame (6), a fishing net (7), and a bait holding basket (22), wherein each said lifting mechanism (4) comprises a motor (9), a rotary shaft (10), a plurality of shaft supports (11) and a plurality of rope units (12), wherein said collection frame (6) has a main frame body (60) defining an opening (62) at a top end (64), wherein said two fishing boats (1) are aligned side by side and are in parallel with each other, wherein said collection frame (6) is positioned between said two fishing boats (1), wherein said fishing net (7) is laid on an inner surface of the collection frame (6), wherein said bait holding basket (22) is mounted to position inside said collection frame (6) through a connecting rod (222), wherein each said fishing boat (1) comprises one said support mechanism (3) and one said lifting mechanism (4), wherein the lifting mechanism of one boat mirrors the lifting mechanism of the other boat, wherein each said motor (9) is positioned proximal to said collection frame (6) and is fixed mounted on the fishing boat (1), wherein said rotary shaft (10) is fixedly mounted on an output terminal (92) of a motor shaft of said motor (9), wherein said rotary shaft (10) is connected to said plurality of shaft supports (11) and a bearing is provided between said rotary shaft (10) and said shaft supports (11), wherein each said shaft supports (11) is mounted on said fishing boat (1), wherein said support mechanism (3) is mounted on said fishing boat (1) at a position between said collection frame (6) and said motor (9), wherein each said rope unit (12) has one end connecting to a top end of said collection frame (6) and an opposing end bypassing an adjacent support mechanism (3) to connect to fix and wind on said rotary shaft (10), wherein said display mechanism (5) is fixedly mounted on said main frame body (60) of the collection frame (6).

2. The fishing device according to claim 1, wherein each said support mechanism (3) comprises a support frame (8), a plurality of wheel units (13) and a plurality of roller shaft (14), wherein said support frame (8) has a top end at which a plurality of indentations (15) are provided, wherein each wheel unit (13) is connected to one corresponding roller shaft (14), wherein each said roller shaft (14) is installed and supported at one said indentation (15).

3. The fishing device according to claim 2, wherein said display mechanism (5) comprises a receiving screen (18), a plurality of optical sensors (16) and a plurality of optical receivers (17), wherein said plurality of optical sensors (16) and said plurality of receivers (17) are fixedly mounted on said collection frame (6) at two opposing inner sides (68) of said collection frame (6), wherein each one said optical sensor (16) is communicating with one corresponding optical receiver (17), wherein each said optical receiver (17) is electrically connected to said receiving screen (18) through a connecting wire (182), wherein said receiving screen (18) is arranged on said fishing boat (1).

4. The fishing device according to claim 2, wherein said the collection frame (6) has a bottom portion (66) and further comprises a rectangular outlet door (19) at its bottom portion (66); wherein said fishing net (7), which is laid on the bottom surface of said collection frame 6, further comprises a rectangular outlet net corresponding to said rectangular outlet door (19); wherein said rectangular outlet door (19) has one end connecting to said collection frame (6) through a hinged connection while another end mounting to said collection frame (6) through an axle pin.

5. The fishing device according to claim 4, further comprising two hooks (20) fixedly mounted to said collection frame (6) at an upper end of said collection frame (6).

6. The fishing device according to claim 5, further comprising a plurality of guiding wheel assemblies (21) fixedly mounted on each said fishing boat (1) respectively.

7. The fishing device according to claim 6, further comprising two solar power supply units (23) mounted on said two fishing boats (1) respectively, wherein each said solar power supply unit (23) is connected to said motor (9) on the corresponding fishing boat (1).

8. The fishing device according to claim 1, wherein said display mechanism (5) comprises a receiving screen (18), a plurality of optical sensors (16) and a plurality of optical receivers (17), wherein said plurality of optical sensors (16) and said plurality of receivers (17) are fixedly mounted on said collection frame (6) at two opposing inner sides (68) of said collection frame (6), wherein each said optical sensor (16) is communicating with one corresponding optical receiver (17), wherein each said optical receiver (17) is electrically connected to said receiving screen (18) through a connecting wire (182), wherein said receiving screen (18) is arranged on said fishing boat (1).

9. The fishing device according to claim 8, wherein said the collection frame (6) has a bottom portion (66) and further comprises a rectangular outlet door (19) at its bottom portion (66); wherein said fishing net (7) is laid on the bottom surface of said collection frame 6, further comprises a rectangular outlet net corresponding to said rectangular outlet door (19); wherein said rectangular outlet door (19)

has one end connecting to said collection frame (6) through a hinged connection while another end mounting to said collection frame (6) through an axle pin.

10. The fishing device according to claim 9, further comprising two hooks (20) fixedly mounted to said collection frame (6) at an upper end of said collection frame (6).

11. The fishing device according to claim 1, wherein said collection frame (6) has a bottom portion (66) and further comprises a rectangular outlet door (19) at its bottom portion (66); wherein said fishing net (7), which is laid on the bottom surface of said collection frame 6, further comprises a rectangular outlet net corresponding to said rectangular outlet door (19); wherein said rectangular outlet door (19) has one end connecting to said collection frame (6) through a hinged connection while another end mounting to said collection frame (6) through an axle pin.

12. The fishing device according to claim 11, further comprising two hooks (20) fixedly mounted to said collection frame (6) at an upper end of said collection frame (6).

13. The fishing device according to claim 1, wherein a mesh number of said fishing net (7) is approximately 1-3 mesh.

14. The fishing device according to claim 13, wherein said the collection frame (6) has a bottom portion (66) and further comprises a rectangular outlet door (19) at its bottom portion (66); wherein said fishing net (7), which is laid on the bottom surface of said collection frame 6, further comprises a rectangular outlet net corresponding to said rectangular outlet door (19); wherein said rectangular outlet door (19) has one end connecting to said collection frame (6) through a hinged connection while another end mounting to said collection frame (6) through an axle pin.

15. The fishing device according to claim 14, further comprising two hooks (20) fixedly mounted to said collection frame (6) at an upper end of said collection frame (6).

16. The fishing device according to claim 1, further comprising a plurality of guiding wheel assemblies (21) fixedly mounted on each said fishing boat (1) respectively.

17. The fishing device according to claim 1, further comprising two solar power supply units (23) mounted on said two fishing boats (1) respectively, wherein each said solar power supply unit (23) is connected to said motor (9) on the corresponding fishing boat (1).

\* \* \* \* \*